United States Patent

Kiji

[15] 3,641,495

[45] Feb. 8, 1972

[54] CHARACTER RECOGNITION SYSTEM HAVING A REJECTED CHARACTER RECOGNITION CAPABILITY

[72] Inventor: Kazuo Kiji, Tokyo, Japan

[73] Assignee: Nippon Electric Company Limited, Tokyo, Japan

[22] Filed: Aug. 12, 1970

[21] Appl. No.: 63,162

Related U.S. Application Data

[63] Continuation-in-part of Ser. No. 664,424, Aug. 30, 1967, abandoned.

[30] Foreign Application Priority Data

Aug. 31, 1966 Japan....................................41/57403

[52] U.S. Cl. ........................................................340/146.3 R

[51] Int. Cl. ..........................................................G06k 9/00

[58] Field of Search...............................................340/146.3

[56] References Cited

UNITED STATES PATENTS 3,263,216 7/1966 Andrews.......................340/146.3 ED 3,259,883 7/1966 Rabinow et al...............340/146.3 ED

*Primary Examiner*—Maynard R. Wilbur

*Assistant Examiner*—Leo H. Boudreau

*Attorney*—Ostrolenk, Faber, Gerb & Soffen

[57] ABSTRACT

A character recognition system for reading alphanumeric characters and/or symbols printed or otherwise formed upon a document. The characters on the document are initially scanned in sequential fashion to generate a signal representative of the character. The representative signal is compared, on a character by character basis, against standardized signals each representing high quality criteria of those characters which the system is capable of recognizing. A signal is generated to indicate any character which fails recognition. After each of the characters are scanned and either identified as valid characters or are rejected, an analysis is made to determine the greatest likelihood of the identity of the rejected character or characters. A second scanning operation is performed on only those characters which have failed recognition. The criteria of those standardized signals compared against the rejected character are also significantly reduced to greatly enhance the probability of recognition of rejected characters.

6 Claims, 12 Drawing Figures

INVENTOR.
KAZUO KIJI
BY
Ostrolenk, Faber, Gerb & Soffen
ATTORNEYS

INVENTOR.
KAZUO KIJI
BY
Ostrolenk, Faber, Gerb & Soffen
ATTORNEYS

INVENTOR.
KAZUO KIJI
BY
Ostrolenk, Faber, Gerb & Soffen
ATTORNEYS

INVENTOR.
KAZUO KIJI

BY
Ostrolenk, Faber, Gerb & Soffen

ATTORNEYS

INVENTOR.
KAZUO KIJI
BY
Ostrolenk, Faber, Gerb & Soffen
ATTORNEYS

INVENTOR.
KAZUO KIJI

BY

Ostrolenk, Faber, Gerb & Soffen
ATTORNEYS

CHARACTER RECOGNITION SYSTEM HAVING A REJECTED CHARACTER RECOGNITION CAPABILITY

This invention is a continuation-in-part of application Ser. No. 664,424, filed Aug. 30, 1967, now abandoned.

The instant invention relates to character recognition systems, and more particularly to a novel character recognition system in which a group of characters is scanned by the scanning means. Recognition circuitry identifies those characters scanned, and applies the information to a computer which then, in the case of a deficient character incapable of being recognized during an initial scan, will initiate a rescan operation, causing the threshold levels of the recognition circuitry to be lowered and enabling only selective ones of the circuits in the threshold circuitry which represent the most logical choices of the deficient characters to be coupled to the computer during the rescanning operation.

The instant invention is characterized by providing a system for the high-speed identification of printed matter and is adapted for recognizing characters (alphanumeric characters, Chinese ideographs, Japanese katakana symbols, etc.) and symbols which have been either handwritten or printed, or mechanically printed upon the surface of a document submitted for recognition purposes. The system is further capable of identifying characters which have failed correct recognition as a result of a degradation in the quality of the script or print by scanning a plurality of characters, most of which have accurately recognized and which may contain one or more error correction characters in order to accurately identify the character suffering a degradation in quality during a rescan operation.

It is common practice in the field of character recognition systems to develop a reject code (instead of a recognition code) whenever the extraction of a necessary and sufficient number of features for enabling accurate identification of a character is lacking as a result of degradation in the quality of the character as a result of voids in a stroke or unwanted strokes added to the character, possibly as a result of a smudge occurring in the character printing process. Two alternative methods have been proposed for the occurrence of rejected characters, which methods are:

In accordance with the first method, rejected characters are rescanned or reread in an attempt to obtain correct recognition.

In accordance with the second method, which has conventionally been employed by systems capable of recognizing only numeric characters, a group of check digits set up by a predetermined procedure through arithmetic operations is printed on an input document, which check digits are related to a group of information digits also printed on the document. If any one of the characters fails to be sufficiently recognized during the recognition operation, or is otherwise rejected, the deficient numerals are automatically corrected through the employment of error-correcting means associated with the recognition system by making reference to the check or redundancy digits. Such check digits are considered to be equivalent to error-correcting codes which are widely used in data communication systems.

The employment of check or redundance digits which may be employed in connection with the second method has found applications not only for the purpose of correcting rejected characters, but also for error detecting in order to determine whether or not correct recognition of a character, which may resemble one or more other characters, has been made (i.e., to determine whether such a character recognition system has incorrectly identified the numeral "8" as being the numeral "3"). In order that such correction may be carried out successfully, the redundancy information requires a considerably lengthy number of redundance or check digits to be printed upon the document being read and which contains associated information digits.

In the recognition of significant alphabetic words, a rejected character or characters can be estimated with a fairly high probability from a consideration of the remaining successfully recognized characters of a scanned word, provided that the reject rate is quite low and the redundancy is high, for instance, when one character, or two characters at most, are rejected out of one significant word comprised of characters of a sufficient length.

However, when the number of characters of which a significant word is composed is quite small, for instance, when the middle character is rejected in a word beginning with "A" and ending with "E," assuming that both of these characters have been correctly recognized, it is next to impossible to estimate as to whether the rejected character was "R" or "G"—that is, whether the word being scanned was "ARE" or "AGE". In addition thereto, other possible choices might be "ACE," "ADE," "ALE," "APE," "ATE," "AXE," and "AWE."

It is, therefore, a principal object of the instant invention to provide a novel reliable character recognition system in which defects or inability to make such corrections commonly encountered in conventional character recognition systems are completely eliminated.

The instant invention is comprised of scanning means for scanning a group of characters provided on a document which may, for example, be a flying spot scanning tube means. The scanning means scans the region occupied by a group of characters by means of a beam which scans in the conventional manner in which the beam of a TV tube scans a tube face. Reflected light from the surface of the document is picked up by a suitable photosensitive means, causing the reflected light from elemental areas of the scanned field to be converted into electrical signals. These signals are transferred to a suitable register means having a length sufficient for providing storage of a signal for each of the elemental areas of the scanned region.

The stored signals are selectively applied to inputs of correlation circuits which may, for example, be summing circuits for summing the digital input signals applied to their input terminals to develop a discrete analog voltage at their output terminals. These discrete analog voltage output levels are each applied to an associated threshold circuit which compares the level of the signal developed by the correlation circuit against a predetermined threshold level set at each threshold circuit. After threshold level is achieved, the signal is applied to an associated gate means for each said circuits.

During an initial scanning operation, all of the gating means are simultaneously enabled so as to pass the state of their associated threshold circuits to an encoder circuit. The encoder circuit selects the output signal from the one gate which passes such signal and converts it into a form (i.e., digital form) suitable for processing in a computer.

After the computer has received signals representative of all the characters of the group scanned and has determined that the characters of the group are all correct, the scanning operation of a second group of characters may then commence.

In the case where any one or possibly more than one of the characters have failed to be satisfactorily recognized, the computer evaluates the information relating to the remaining characters which have been successfully recognized in order to generate signals representative of those characters or symbols of the entire full character capacity of the machine which are the most logical or probable choices for the deficient character. These signals are then applied to the gates associated with the correlation circuits for selecting the most logical character choices so as to enable only those gates and thereby disable all remaining gates.

In addition thereto, the computer is caused to develop a signal for initiating a rescan operation of this group of characters or of the one deficient character, and further is caused to develop a signal applied to all threshold circuits to lower the threshold levels for these circuits so as to reduce the strict criteria for identification by a predetermined amount. The rescanning operation and subsequent recognition operation by the correlation circuitry and threshold circuitry thereby absolutely guarantees that all characters of the rescanned group will be recognized with an extremely high probability of accuracy.

It is, therefore, one object of the instant invention to provide a novel character recognition system which eliminates any possibility of failure of recognition.

Another object of the instant invention is to provide a novel character recognition system which scans characters in groups, identifies all of the scanned characters (in computer language) as being either recognized or misrecognized, and causes the computer to ascertain the correctness of the group of scanned characters and to request a rescanning operation of either that character or those characters which failed recognition or of the entire group of characters wherein the strict criteria for each character recognition circuit is reduced by a predetermined amount and wherein only selected ones of the recognition circuits representing the most logical choices of the misread or unrecognized characters are enabled to apply their outputs to the computer.

These and other objects of the instant invention will become apparent when reading the accompanying description and drawings in which:

FIGS. 1*a* through 1*c* respectively illustrate three typical examples of input documents, each of which depicts either a line of handprinted or mechanically printed characters which may be the subject of a recognition operation.

The principles of the instant invention will now be described in connection with three typical documents on each of which only one line of characters has been shown for purposes of simplicity and which groups of characters may become the subject of recognition by the system of the present invention. These examples are presented herein for purposes of facilitating and understanding of the invention. It should further be understood that the actual process of entry of the characters upon the documents may be any conventional method such as by hand or by mechanical, electrostatic, photographic or other means, and in any case, the system of the instant invention is capable of identifying those characters normally identifiable through conventional character recognition systems.

Figure 1A:
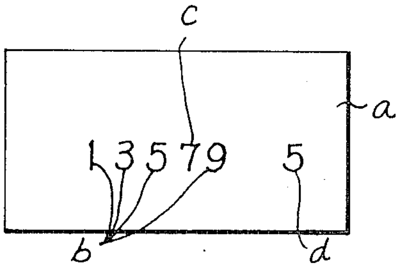

Making reference to FIG. 1*a*, there is shown therein a document a which may, for example, be a card, a sheet of paper, or any other character-bearing surface. The numerals *b* and *c* which have been printed or otherwise formed on the document may, for example, represent an amount of a transaction, whereas the numeral identified by the character *d* represents a check digit. In the example given in FIG. 1*a*, the sum of the individual numbers in the group comprised of numbers identified by the characters *b* and *c* and the check digit designated by the character *d* is contrived so as to be invariably an integral multiple of a modulus "10." For example, adding up the figures 1, 3, 5, 7 and 9, the total is 25. In order to make the sum of the group of numbers designated by characters *b* and *c* and the check digit designated by the numeral *d* to be exactly an integral multiple of "10," the check digit "5" is selected, yielding a total of "30" which can clearly be seen to be an integral multiple of "10."

Let it now be assumed that the numeral "7" identified by the character *c* is poorly printed and as a result thereof fails to be recognized by a character recognition system. In spite of this, the rejected character can simply and easily be identified as the character "7" by summing the correctly identified information characters and the check digit character and subtracting this result from an integral multiple of 10 so as to yield a very reliable error correction capability. However, incorrect estimation of the defective character will result if the recognition of any one of the remaining unrejected characters of the groups *b* and *d* is incorrect, due to the fact that the redundancy taken for the check digits is insufficient. In order to compensate for the insufficient redundancy of the above example, the following means is incorporated in the character recognition system of the instant invention:

In the case where a reject of one or more characters occurs, the corresponding characters are each rescanned, the rejected character features are extracted, and a determination of whether or not the extracted features match most of the features necessary for recognition of the most likely character ("7" in this particular example) is roughly checked by virtue of a lowering of the strict identifying criteria. A recognition code corresponding to the most likely character, i.e., "7" in the instant example, will thereby be developed as an output in lieu of a reject code if the rescanned information matches most of the features possessed by the most likely character.

Figure 1B:
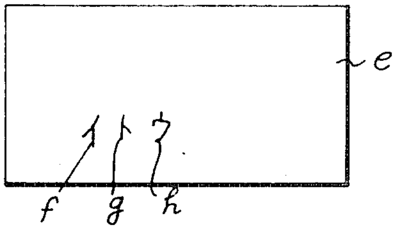
Figure 1C:
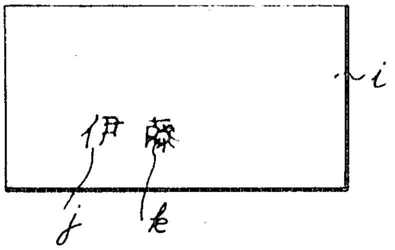

The above-mentioned rescanning and coarse matching process may be applied with equal success in reading the exemplary documents shown in FIGS. 1*b* and 1*c*. In FIG. 1*b*, the document *e* is shown to have printed or otherwise formed on the surface thereof a written or printed Japanese name pronounced ito, and spelled by Japanese "katakana" symbols designated by the characters *f*, *g* and *h*, respectively.

In FIG. 1*c*, the document *i* is shown to contain or have otherwise formed on the surface thereof two Chinese ideographs or characters designated by the characters *j* and *k*, respectively, which characters spell the same Japanese name ito.

Since entries upon the documents are restricted to names of Japanese people, the joint probability for estimating a rejected character when any one of these characters has been rejected, may be computed in advance. For example, in case a reject occurs of the character designated by the letter *f*, it can be estimated that the rejected character was either one of

"τ", "π", "π", "I", and so forth. In a like manner, when a reject occurs at the character denoted by *j* of FIG. 1*c*, it can also be estimated that the rejected character is more than likely one of

"1P", "1Σ", "π□", "ƷI", and so forth. In such cases, the least rejected character should be rescanned so as to determine whether or not the rescanned character features coarsely match the features of a plurality of probable characters (i.e., probable choices) so that the most probable character can be selected from amongst the most probable choices. This selection is accomplished by a coarse-match recognition means as a substitute for the fine-match recognition circuitry employed for character recognition during the initial scanning operation.

An outstanding feature of this invention resides in the fact that whenever a reject occurs in the initial scanning period, estimation of the most probable choice or choices of the rejected character is made, which is followed by a rescanning of at least the rejected character and then by recognition verification for the estimated character through the use of coarse-match recognition circuitry in order to provide error-free correction of the rejected character.

It therefore becomes obvious to one skilled in the art that the introduction of such means significantly reduces the redundancy of check digits or unduly numerous check digit positions without sacrificing the system reliability in scanning devices for numeric reading operations as well as improving recognition reliability of words in the case of alphabetic character recognition systems.

The principles of the instant invention will now be described in further detail in connection with the schematic block diagram of FIG. 2 which illustrates one preferred embodiment of the invention. As shown therein, numeral 100 denotes a document provided for processing on which characters to be recognized are provided thereon by manual or mechanical printing operations or which may be formed through other operations such as electrostatic printing, photographic printing and so forth.

A flying spot scanner 101 optically scans the characters by means of a scanning beam which traces a pattern much like the electron beam of a conventional TV tube. The scanner optically scans the characters, one by one, in succession and is designed to deliver a binary output of either "one" or "zero" to an output conductor 102 in response to respective black or white elemental areas of the characters being scanned. Conventionally this is performed by providing suitable photosensitive means (not shown) which convert reflected light from elemental surface areas of the region containing the characters into such binary electrical signals.

The train of electrical signals generated by the flying spot scanner 101 are applied in sequential fashion to a shift register 103 which is capable of storing the electrical pattern developed by the scanning operation and applied to the shift register through conductor 102. The capacity of the shift register is designed to have a capacity (i.e., a sufficient number of binary stages) for storing the electrical pattern (i.e., the constituent binary electrical signals) for the entire region of a single character.

Such shift registers may typically be comprised of a plurality of bistable flip-flop circuits connected in cascade and having suitable circuitry for shifting signals therethrough so as to load the representative binary signals for an entire character or in the case of the instant invention so as to load all of the signals representative of the elemental areas in the region of a character into the register. Whereas each stage of the shift register is typically provided with at least one output line capable of providing a first signal level indicative of a binary "one" state and a second signal level indicative of a binary "zero" state (i.e., to represent dark or white areas of the region occupied by the character), only one output line of register 103, namely, output line 103*a* is shown herein for purposes of simplicity.

Numerals 104–1 through 104–*n* respectively identify a plurality of correlation networks each of which receives outputs from each stage of the shift register. The correlation networks provided are equal in number to the capacity of characters and/or other symbols capable of being recognized by the character recognition system. The correlation networks are provided for obtaining a match between the electrical pattern of a scanned character stored in shift register 103 and each of the reference patterns that have been determined in advance. The correlation values are developed at the output conductors 105–1 through 105–*n*, respectively, so as to be applied to the threshold circuits 106–1 through 106–*n*, respectively.

The description to this point constitutes an outline of conventional techniques, one or more of which have been employed in numerous character recognition systems. Such conventional techniques are fully described, for example, in the book "Optical Character Recognition," on pages 51–56, which book has been published by McGregor and Werner, Inc. in the United States of America. Any further detailed information regarding such conventional techniques are incorporated herein by reference to the above-mentioned publication.

The threshold circuits each have a preset threshold level which is compared with the signal level obtained from the associated correlation network in order to develop a binary "one" output for delivery to an appropriate one of the output conductors 107–1 through 107–*n*, respectively, only when the scanned character best matches any one of the reference patterns, as manifested by the threshold level.

Figure 4:
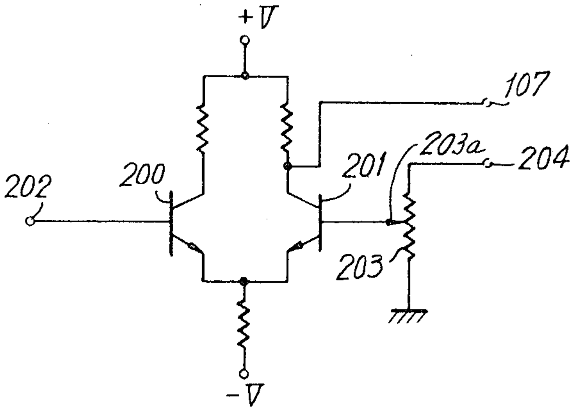
FIG. 4 is a schematic diagram illustrating one embodiment of a threshold circuit which may be employed in the character recognition system of FIG. 2.
Figure 2:
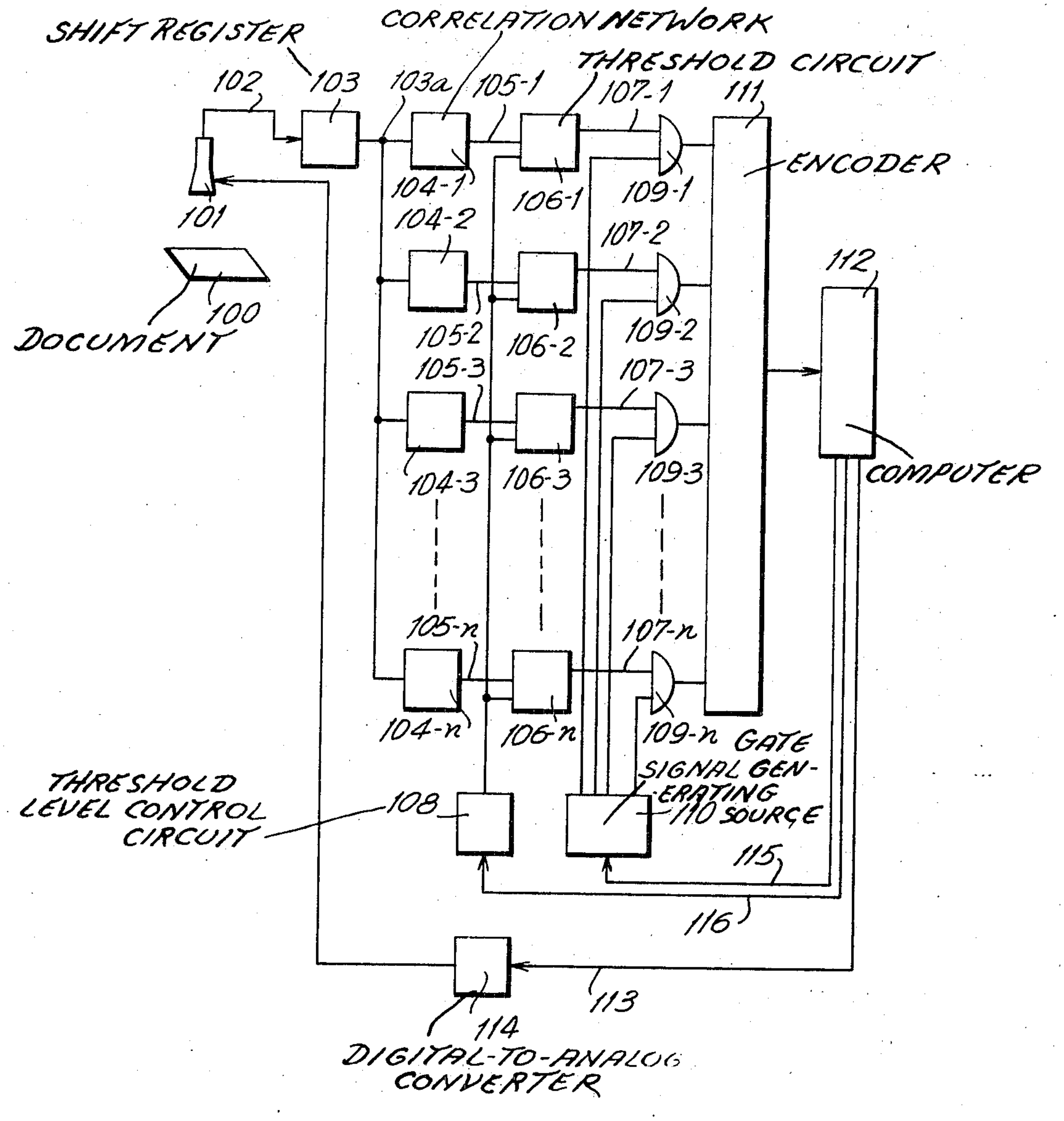
FIG. 2 is a schematic block diagram illustrating one embodiment of a character recognition system designed in accordance with the principles of the instant invention.

FIG. 4 illustrates a schematic diagram of one preferred embodiment of the threshold circuit, shown in block diagram form in FIG. 2, wherein transistors 200 and 201 are electrically coupled so as to form a high-gain differential amplifier. The output of the associated correlation network is connected to the amplifier by applying its output signal to the base electrode of transistor 200 by way of an input terminal 202. The threshold voltage is applied to the base electrode of transistor 201 by way of input terminal 204. The threshold level is adjustably preset by the magnitude of the voltage level applied to terminal 204 and the tap position to which the slidable arm or tap 203*a* of potentiometer 203 is set. Terminal 107, the output terminal of the threshold circuit, couples one of the output conductors 107–1 through 107–*n* to the collector electrode of transistor 201. Terminal 204 is coupled to the output of threshold level control circuit 108, shown in FIG. 2, which is connected to the input of each threshold circuit and which will be more fully described herein below.

Making further reference to FIG. 2, it can be seen that the outputs of the threshold circuits 106–1 through 106–*n* are respectively applied to one input of an associated AND-gate 109–1 through 109–*n*, respectively. Gate signals, generated by a gate signal generating source 110 are applied, respectively, to the remaining input of all AND-gates 109–1 through 109–*n*, respectively, or to selected ones thereof as will be more fully described.

Returning to a consideration of FIG. 2, to can be seen that the outputs of the threshold circuits are applied to one input of an associated one of the AND-gates 109–1 through 109–*n*, while the gate signals generated by gate signal generating source 110 are applied, respectively, to the other inputs of each of the AND gates. The source 110 develops an *n*-bit signal corresponding to the number of AND gates provided in the system and is capable of furnishing a binary ONE to each of the AND gates which are to be enabled by source 110.

Normally, i.e., for other than rescan operations, all of the outputs emanating from source 110 are at the binary ONE level, and this clearly indicates that all gates will be enabled during an initial scan operation.

Block 111 constitutes the encoder which develops a digital output signal indicative of the recognized character as a result of receiving the output of AND-gates 109–1 through 109–*n* as its input signal. This digital output is applied to electronic computer 112.

Let it be assumed that all characters contained in a character group are written or printed in an orderly manner at regular intervals. Then, whenever a binary ONE fails to appear at the output of any threshold circuit in spite of the fact that a character is present at this time and is being scanned, the reject code indicative of the inability to achieve recognition of the character is developed by encoder 111 and is transmitted to computer 112. This technique of developing a rejection code is well known to those skilled in this particular technical field and will be described later.

As soon as the reject code reaches the computer 112, the position of the character in the line of print is acknowledged and the computer estimates, in the manner previously described, the rejected character by utilization of a check digit or check digit groups or on the basis of the characters of the group which may be disposed both before and/or after the rejected character. When such an estimation is made, an instruction signal for the purpose of initiating a rescanning operation is developed in the computer and appears in output line 113.

Either of the two alternative scanning methods may be employed as follows:

The first method constitutes rescanning of the line of print containing the rejected character from the beginning while the second method causes rescanning of only the rejected character or characters by way of delivering signals indicative of the coordinates identifying the location of the rejected character or character's position to conductor 113 and thereby applying (or conducting) suitable bias voltages (or currents) to the deflection electrodes (or coils) by way of a digit-to-analog converter 114.

Regardless of which rescanning method is employed, the code indicative of the corresponding estimated character, or characters, i.e., what constitutes the most logical choice or choices of the deficient character or characters, is applied to output conductor 115 of the computer during the rescanning operation. The hate signal generating source 110 is provided with means for decoding this code pattern so as to supply a binary ONE level to the input of a selected one or selected ones of the AND-gates 109–1 through **109–*n* that correspond to the most logical choice or choices of the deficient character or characters, and which applies a binary ZERO level to each of the remaining AND gates. Obviously, in the case where more than one character has failed recognition, the computer causes a code to be generated which controls the gate signal generating source 110 to enable only those AND gates associated with the most logical choices for the character being scanned. Thus, if more than one character has failed recognition, only the logical choices associated with the deficient character will be applied to source 110 to enable only those AND gates associated with those choices. If more than one character has been rejected, then the computer will control source 110** to enable the AND gates associated with the most logical choices for those characters.

Simultaneously, with the rescanning of a rejected character, a command for alteration of the threshold level is developed by computer 112 and applied to the level control circuit 108 by way of the output line 116.

Figure 5:
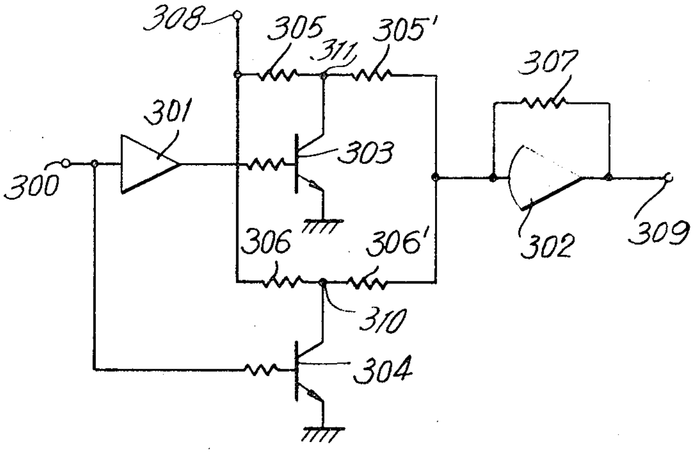
FIG. 5 is a schematic diagram illustrating one embodiment of a threshold level control circuit which may be employed in the character recognition system of FIG. 2.

FIG. 5 is a schematic diagram showing one preferred embodiment of the threshold level control circuit employed in FIG. 2 wherein 301 represents an inverter circuit, 302 designates an operational amplifier, 303 and 304 designate switching transistors, 305, 305', 306 and 306' are input resistors for the operational amplifier, and 307 is a feedback resistor. When the threshold alteration command signal is applied to terminal 300 of the circuit of FIG. 5, the threshold level (which remains unaltered during an initial scanning or which has been altered during a rescanning operation) is transmitted to each of the threshold circuits 106–1 through **106–*n* by way of output terminal 309**.

Let it be assumed that the command signal is at a binary ONE level while rescanning a rejected character and is at a binary ZERO level during all other periods. Thus, during rescanning, the switching transistor 304 is rendered conductive by the application of a command signal which is delivered through conductor 116 to terminal 300. The conduction of switching transistor 304 causes the common terminal 310 between resistors 306 and 306' to be at ground potential. When a binary ZERO level signal is applied to input terminal 300 transistor 304 is nonconductive. However, inverter 301 inverts the binary level applied to input terminal 300 causing transistor 303 to be rendered conductive which places the common terminal 311 between resistors 305 and 305' at ground potential. It can thus be seen that either transistor 303 or 304, but not both, is rendered conductive at any given instant.

The voltage −E applied to terminal 308 is thus coupled to operational amplifier 302 through either resistors 305 and 305' during rescanning or through resistors 306 and 306' during all other periods.

Let is be assumed that the sum of resistances of resistors 305 and 305' has been set to be equal to the resistance of the feedback resistor 307 and let it further be assumed that the sum of resistances of resistors 306 and 306' be equal to 1.5 times the resistance of the feedback resistor. Under this condition, the output voltage of threshold level control circuit to be expressed as E volts during rescanning of the rejected character and as ⅔ E volts during all other periods. Thus, the threshold level for determining character match is reduced during rescanning from the normal level existing during initial scanning. As a result thereof, the output or binary ONE of a corresponding threshold circuit which indicates that a rejected character has been recognized (due to a substantial reduction in recognition criteria) is transmitted to the encoder through the associated AND gate provided, however, that the character pattern corresponding to the rejected character coarsely or roughly matches the reference character pattern. It should be obvious that the perfect or fine match between the scanned and the reference character can never be expected in such a situation due to the poor print quality (i.e., smudging or other deterioration) of the character rejected during the first scan.

The merits of the above technique can be more fully appreciated by reference to the document *a* illustrated in FIG. 1a. Information that the rejected character *c* may be the decimal number "7" is delivered from the computer to the character recognition system which further initiates rescanning of the rejected character. The rejected character is now recognized by a threshold level setting which is somewhat lower than its setting during initial scanning and the fact that the estimated character should be a decimal "7" will be now confirmed. It must be noted here that since all of the threshold levels of the threshold circuits have been set lower during the rescanning operation, some of the outputs of the other-than-"7" threshold circuits could possibly generate a binary one during the rescanning period. Considering some of the possible consequences of the present example, the output of the threshold circuit for the decimal character "1" which apparently somewhat resembles the decimal character "7" may yield a binary ONE output at the same time that the threshold circuit FOR for the character "7" develops a binary ONE output. Such undesired operation is effectively blocked by the provision of the AND-gates 109–1 through **109–*n* which inhibit the outputs of their associated threshold circuits from being applied to encoder 111 as a result of the "most logical choice" operation of computer 112 which controls source 110 through its output line 115** to enable the AND gate associated with the most logical choice and to inhibit all others.

Operations similar to that described above may be performed in identifying printed and alphabetical characters such as, for example, the Japanese "Katakana" symbols, as shown in FIG. 1*b*, or the Chinese ideographs as depicted in FIG. 1*c*. Recognition of Chinese characters is feasible through the use of the state of present technological development as manifested, for example, in a treatise entitled "Recognition of Printed Chinese Characters" published in the IEEE Transactions on Electronic Computers, Feb. 1966, and appearing on pages 91–101.

In either of the above three cases, when a rejected character condition occurs, the most logical choice or choices for the rejected character which have a probability of correctness lying above a predetermined level, are selected by use of a suitable program employed in electronic computers and each of the estimated character codes is delivered to conductor 115.

The rescanning operation for characters provided on the exemplary document of FIG. 1*b* may be performed substantially in the same manner as that described above with reference to rescanning of numerals on the document of FIG. 1*a*, with the exception that the difference in the threshold level setting between scanning and rescanning operations may be slightly more complex and critical than in the scanning and rescanning of numbers—i.e., when the range of characters to be handled is broadened to cover Japanese "Katakana" and/or Chinese characters.

Figure 6:
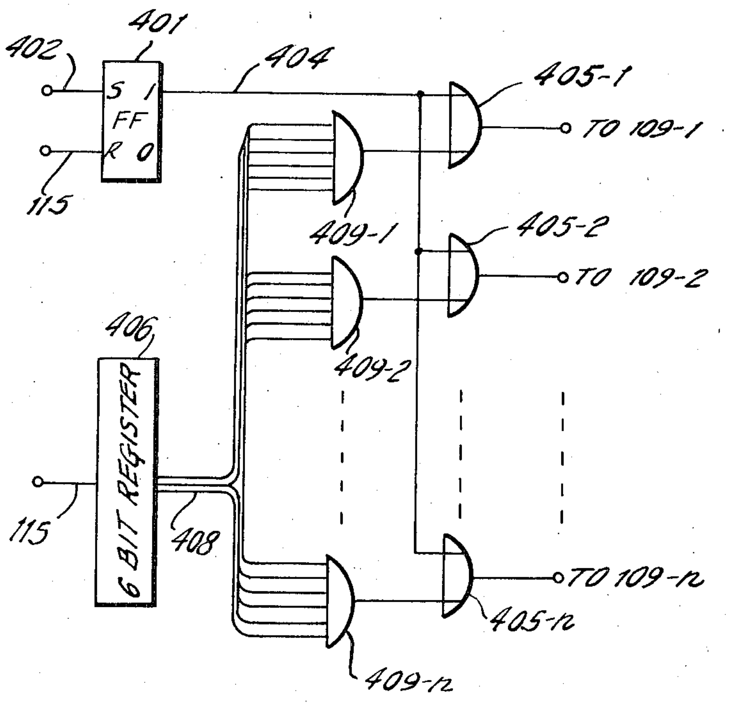
FIG. 6 is a logic diagram showing the gate signal generating source of FIGS. 2 and 3 in greater detail.

The gate signal source 110 may have the structure as shown in FIG. 6. In FIG. 6, an initial scan flip-flop 401 is set when the document arrival signal (not shown) generated when the document 100 of FIG. 2 passes beneath scanner 101 is applied to the signal line 402. The set signal "1" of flip-flop 401 is applied through the signal line 404 to OR-gates 405–1, 405–2, . . . **405–*n*. When the signal for designating the rescanning operation is generated on the signal line 113 from the computer 112 and when the signal (for example, six-bit signal) representing the rejected character is generated on the signal line 115 from the computer 112, the six-bit signal is temporarily stored at the six-bit register 406 and the signal "1" is applied to the reset (R) terminal of the flip-flop 401, causing flip-flop 401 to be reset. The output signals (six-bits) of register 406 are coupled through leads 408 to AND-gates 409-1, 402–2, . . . , 409–*n*. More specifically, one of the AND-gates 409-1, 409–2, . . . 402–*n* is actuated corresponding to the contents stored at the register 406. The outputs of AND-gates 409–1, 409–2, . . . 409–*n* are respectively connected to OR-gates 405–1, 405–2, . . . 409–*n*. The output signals of OR-gates 405–1, 405–2, . . . 405–*n* are applied to the AND-gates 109–1, 109–2 . . . 109–*n* of FIG. 2, respectively. Likewise, inasmuch as the initial scan flip-flop 401 is set at the initial scanning operation, all the output signals of the gate signal generating source 110 become "1." However, during the rescanning operation, only that output of outputs 109–1 through 109–*n* which is designated by the code set into register 406 by computer 112** becomes "1."

Figure 7:
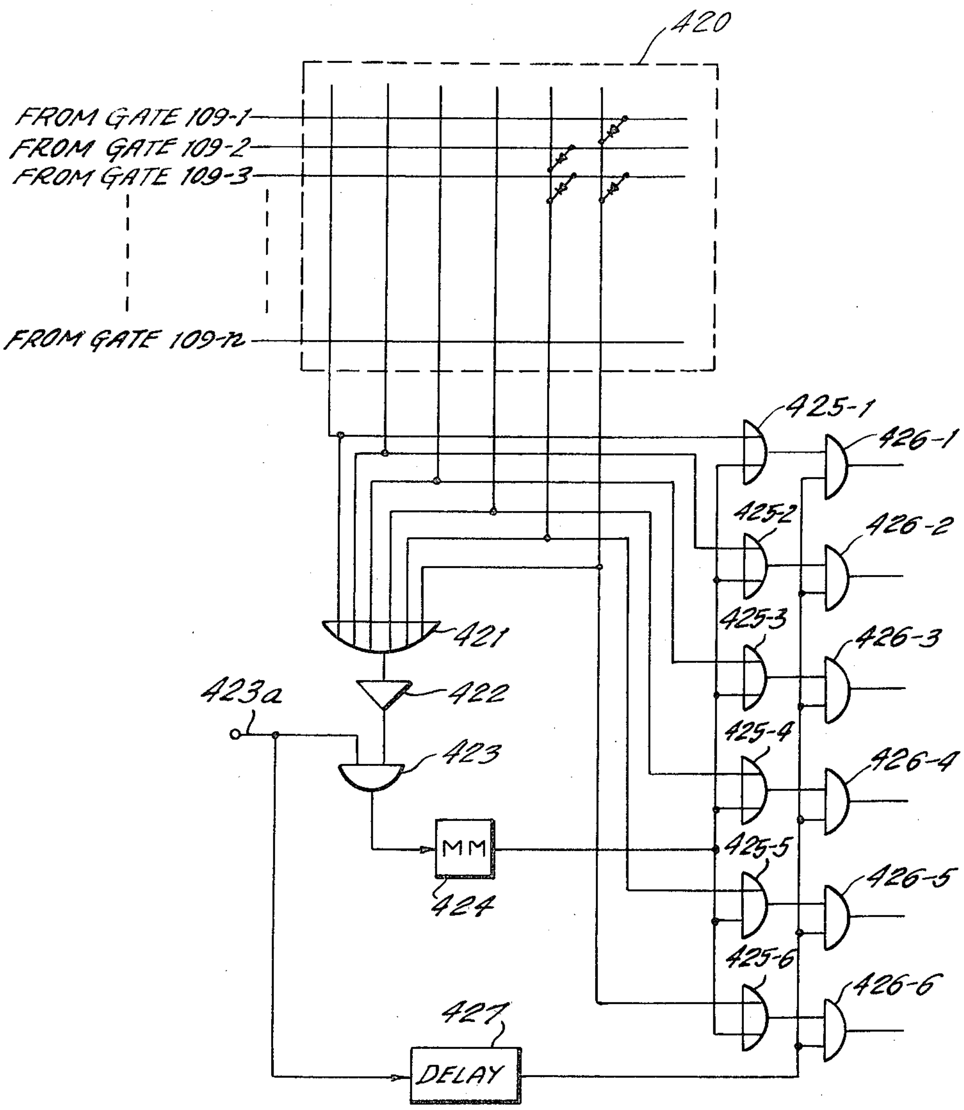
FIG. 7 is a logic diagram showing the encoder of FIGS. 2 and 3 in greater detail.

The encoder 111 of FIG. 2 may be of the type shown in FIG. 7.

The encoder 111 includes a diode matrix 420 for converting the output signals of the AND-gates 109–1, 104–2, . . ., **109–*n***, the information being represented by a one-out-of-*n*-bit code, into a six-bit binary code and the rejected code generating means. The signals converted into the six-bit code by the diode matrix 420 are applied to OR-gate 421. The output signal of OR-gate 421 is coupled through the inverter 422 to one terminal of AND-gate 423. Character-scanning completion signals (not shown) are applied through the signal line **423*a* to the remaining input of AND-gate 423 as each character scan is completed. Therefore, when one character scanning operation is over and no recognition signal (for instance, the signal from one of the AND-gates 109–1, 104–2, . . . 109–*n***) is given to any one of *n*-input terminals of the diode matrix 420, the output signal of the AND-gate 423 become "1." Therefore, the output signal of the monostable multivibrator 424 connected to the AND-gate 423 becomes "1" for several tens of microseconds. The output terminal of multivibrator 424 is connected to one input terminal of each of the OR-gates 425–1, 425–2, . . . 425–6. The six output lines of the diode matrix 420 are respectively connected to the remaining input terminals of the OR gates of 425–1, 425–2, . . . , 425–6. Output signals of the OR-gates 425–1, 425–2, . . ., 425–6 are coupled to a respective one of the input terminals of AND-gates 426–1, 426–2, . . ., 426–6.

The character scanning completion signal is passed through a delay circuit 427, having a shorter delay time than the pulse width of the multivibrator 424, to the remaining input terminals of the AND-gates 426–1, 426–2, . . ., 426–6. When the scanned character is capable of being recognized, the six-bit code representing the character is produced from the AND-gates 426–1, 426–2, . . . , 426–6 and applied to the computer 112. On the other hand, when the scanned character for recognition is not clear enough for recognition, the rejection code (for instance, 111111) is produced from the AND-gates 426–1, 426–2, . . ., 426–6, and is applied to the computer 112.

Figure 8:
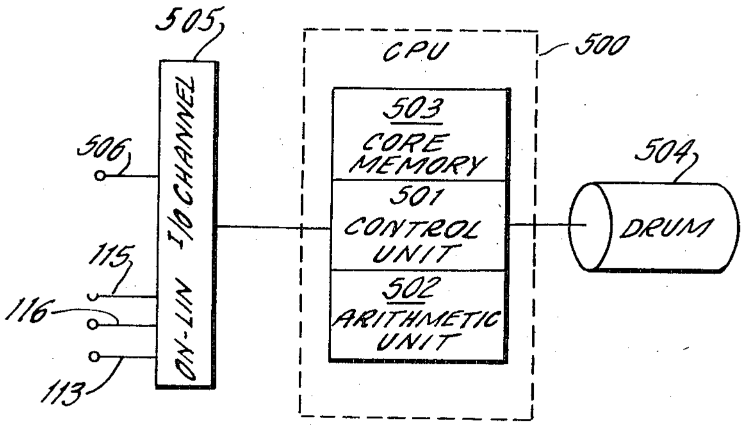
FIG. 8 is a block diagram showing the components utilized in the computer of FIGS. 2 and 3 in greater detail.

The computer 112 may have the structure as shown in FIG. 8. As shown in FIG. 8, the computer 112 has a central processor unit 500 including control unit 501, arithmetic unit 502 and core memory 503, as well as magnetic drum 504 and online input/output channel 505. Description will now be given as to the function of the computer 112 in the readout stage as shown in FIG. **1*a*. When the document arrival signal is generated on the input line 506 of the online I/O channel, the signal is led to the CPU 500** and the memory contents of the storage positions identified by the addresses (*a*) to (*a*+*l*) for example, of the core memory 503 allotted to store the input data are cleared. Next, when the numeric code including the rejected code is applied through the line 506 and the I/O channel 505 to the CPU 500, this numeric code is stored at addresses (*a*), (*a*+1), (*a*+2) . . ., (*a*+*l*) of the core memory 503 allotted to memorize and store the recognized results one after another in sequential fashion. After the scanning operation for the document 100 is completed, the memory contents of addresses (*a*) to (*a*+*l*) are checked to examine whether those memory contents have the rejected code. If a rejected code is stored in any of these address positions, the memory contents of those addresses (*a*)–(*a*+*l*), except for those addresses having the rejected code, are added at the arithmetic unit 502, and the operation for subtracting ten from the resultant summation is repeated until the surplus becomes one digit. If the surplus is reduced to one digit, the operation for subtracting the surplus from 10 is carried out and this result is stored in an address (*b*) of core memory 503. Then, the memory content at address (*b*) which represents the estimated character for the rejected character is transmitted through the channel 505 to the line 115 in the form of a binary code. Furthermore, the threshold level conversion signal and the rescanning start signal are applied through the I/O channel 505 to the lines 116 and 113, respectively. To described the system operation for documents as shown in FIG. **1*b*, the rejected character is suited for estimation by employing the dictionary lookup system. More specifically, the dictionary is prestored in the high memory capacity drum 504**. Now, if a rejected character is stored in any one of the addresses (*a*) to (*a*+*l*) of the core memory 503, the recognized characters (excluding the rejected characters) are compared with the words recorded in the drum 504 one after another. Furthermore, if the recognized character is found to be coincident with the word of the drum 504, the storage operation causes the character, which forms the word of the dictionary corresponding to the rejected character, to be stored in the (*b*) address of the core memory 503 as the estimated character. If the rejected character may be any one of several estimated characters, those estimated characters are stored in addresses (*b*), (*b*–1), (*b*–2), and so forth, one after another. When the reference operation for the dictionary is completed, the information stored in the (*b*) address is applied through the I/O channel 505 to the line 115. At the same time, the threshold level conversion signal and the rescanning start signal are applied through the I/O channel 505 to line 116 and line 113, respectively. Likewise, if several estimated characters are produced, the above-mentioned operation is repeated until the rejected code is extinguished.

Figure 9:
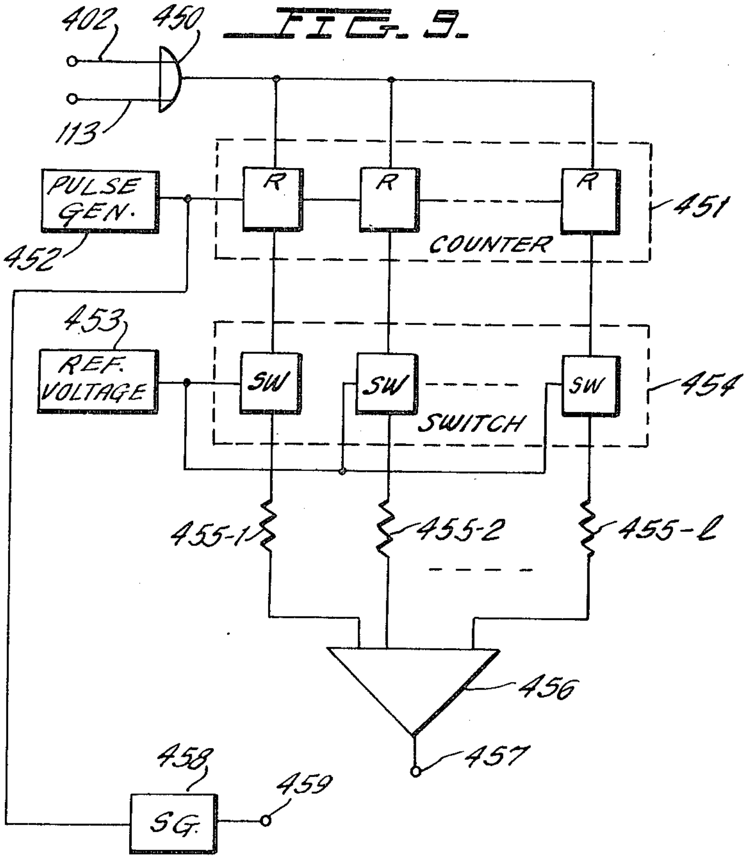
FIG. 9 is a logic diagram showing the digital-to-analog converter of FIGS. 2 and 3 in greater detail.

The digital-to-analog converter 114 of FIG. 2 may be of the type shown in FIG. 9. In FIG. 9, the document arrival signal is applied through the line 402 to one of the input terminals of OR-gate 450. The rescanning start signal produced from the computer 112 is applied through the line 113 to another input terminal of OR-gate 450. The output signal is sent to the reset terminals of each stage of the *l*-bit counter 451. Counter 451 is driven by a pulse generator 452. Each bit of counter 451 is applied to one input terminal of analog switch 454.

The output voltage of the reference voltage generator 453 is applied to another input terminal of the switch 454. The voltage of the generator 453 is applied through the resistors 455–1, 455–2, . . ., **455–*l* to the operational amplifier 456 according to the contents of the counter 451 and is added thereto. In this manner, the horizontal deflection voltage is produced from the amplifier 456. To describe the operation in more detail, the digital value of the counter 451 is converted into analog value, and is applied through the output terminal 457 to the horizontal deflection coil (not shown) of the flying spot tube 101 of FIG. 2. The output signal of the pulse generator 452 is also applied to a sawtooth wave generating circuit 458. The circuit 458 generates one sawtooth wave signal for one step of the counter 451. The sawtooth wave signal (i.e., ramp) is transmitted through the signal line 459 to the vertical deflection coil (not shown) of the tube 101 of FIG. 2. As has been mentioned above, in accordance with the deflection signal produced from the digital-to-analog converter 114, the initial scanning operation and the rescanning operation for the document are carried out. The operations of above-mentioned various devices, 111, 112 and 114** are described in many references and are well known in the character recognition art.

For example, with respect to the encoder 111, a similar operation is found in the description for FIG. 12 of U.S. Pat. No. 3,217,294.

As to the computer 112, a similar operation is described in U.S. Pat. No. 3,259,883 (Rabinow et al.).

As for the digital-to-analog converter 114, similar operation is disclosed in the text entitled "Electronic Analogue and Hybrid Computer" published by McGraw-Hill 1964, page 469.

Figure 10:
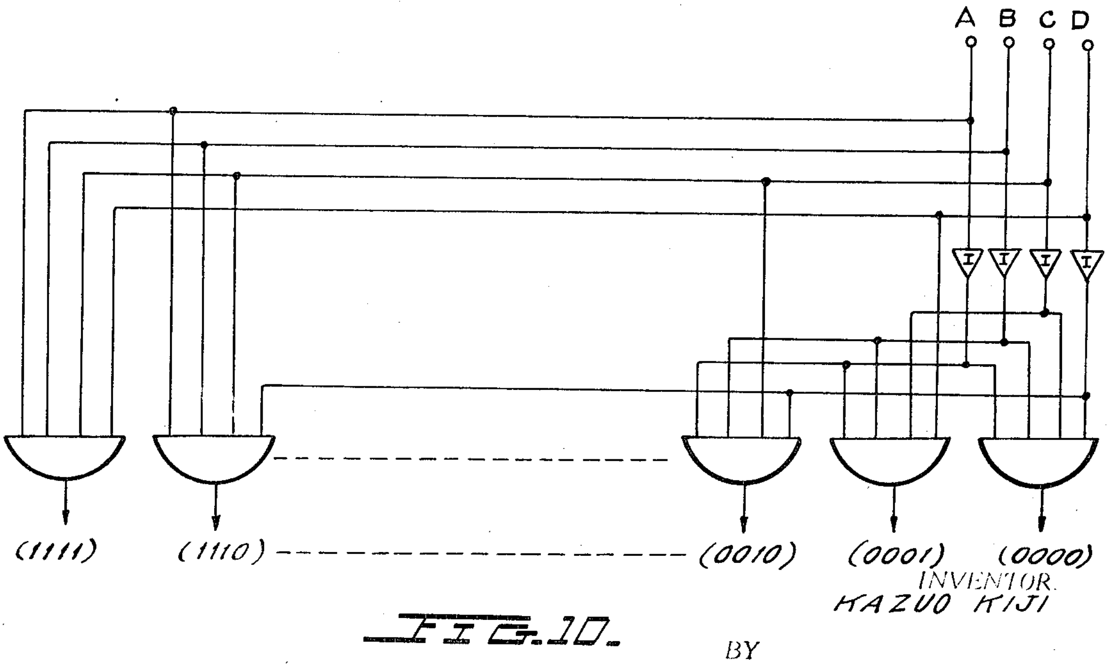
FIG. 10 is a logic diagram showing another arrangement for the gate signal generating sources of FIGS. 2 and 3 in greater detail.

As regards the gate signal source 110, it is obvious that such devices can be obtained by combining various conventional logic circuits. More specifically, the device 110 operates as a decoder. In such a device, six-bit signal applied to its input is decoded into one-out-of-*n*-output signal. Likewise, such device as 110 can be easily obtained by those skilled in the art, in which decoding logic is employed to convert a multibit binary input into a single output signal at the associated one of the N outputs. For example, see FIG. 10 which shows a logic circuit for converting a four-bit binary signal group into one of N(16) possible outputs.

Whereas the instant invention has been described in connection with the use of a correlation method as the means for character recognition, it should be further understood that the techniques of the invention described herein may be applied to any other recognition schemes such as, for example, the conventional character feature extraction technique which uses stroke analysis as is disclosed in the previously mentioned text "Optical Character Recognition," on pages 15–17.

Figure 3:
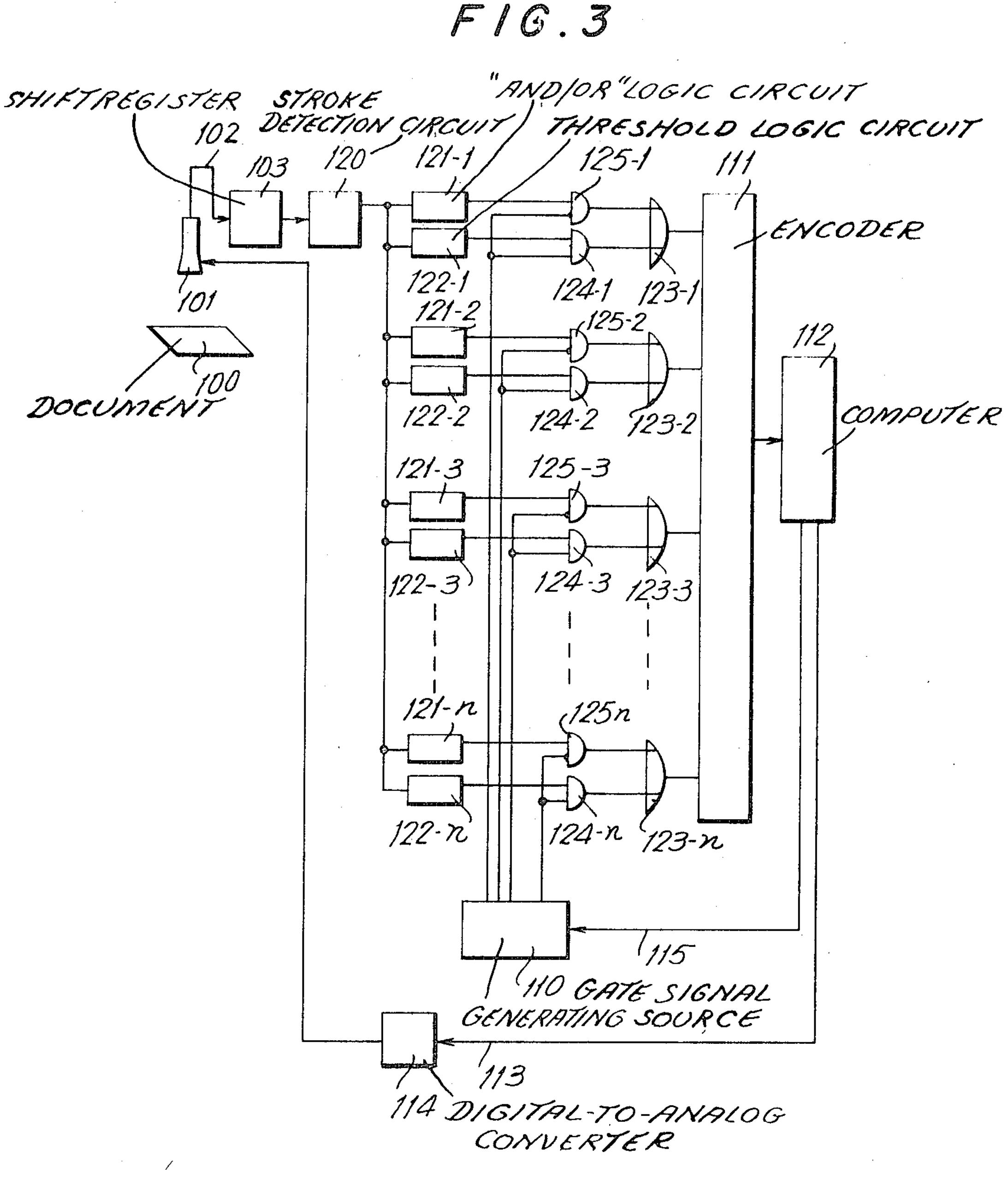
FIG. 3 is a schematic block diagram illustrating still another embodiment of the instant invention.

FIG. 3 illustrates another preferred embodiment of the invention in which the stoke analysis technique is employed and wherein blocks performing substantially the same functions as have been described with reference to FIG. 2 are denoted by like reference numerals.

FIG. 3 differs from the embodiment of FIG. 2 in that a stroke detection circuit 120 is coupled to register 103. The output of stroke detection circuit 120 is applied to the threshold (majority) logic circuits 122-1 through **122-*n* each of which receives the output of the stroke detection circuit. The output of stroke detection circuit 120 is further coupled to the AND/OR logic circuits 121–1 through 121–*n***.

The threshold logic circuits may, if desired, be substituted by AND/OR logic circuits which are designed to identify either a minor or a major part of a character—i.e., to receive features (strokes) fewer in number than those allotted to AND/OR logic circuits 121-1 through **121-*n***, respectively.

The AND/OR logic circuits and the threshold logic circuits having the same suffixes are respectively arranged in pairs and the number of such paired circuits provided is equal in number to the capacity of different characters capable of being handled by the system for purposes of character recognition.

OR-gates 123–1 through **123–*n* each receive the outputs of the pairs of AND-gates 124–1 and 125–1 through 124–*n* and 125–*n* associated therewith. One input of each of the AND-gates 124–1 through 124–*n* is connected to the output of an associated threshold logic circuit 122–1 through 122–*n*, respectively, while one input of each of the AND-gates 125–1 through 125–*n* is connected to the output of an associated logic circuit 121–1 through 121–*n*, respectively. The remaining inputs of both AND-gate groups forming the pairs are respectively connected to associated output lines of the gate signal generation source 110. It is thus possible to select and enable only one of the pair of AND gates while turning the other one OFF under control of the level of the output signal from gate signal generation source 110. The input terminal of AND-gates 125–1 through 125–*n* coupled to an associated line of source 110 constitutes an inhibit input. Thus, if a binary one level signal appears at any one of the output lines of source 110 this acts as an inhibit signal causing the AND-gate 125 associated therewith to be disabled. However, if a binary ZERO level appears at any one or more of the outputs of source 110 the AND-gate 125 associated therewith is no longer inhibited and is thereby enabled to pass the output state of its associated logic circuit 121**.

In the initial period during which a character is scanned and recognized for the first time, a binary ZERO level signal is developed at all output lines of source 110, causing only the AND-gates 125 of the AND-gate pairs 124–125 to be turned ON (i.e., enabled) while the remaining gates 124 are all turned OFF (i.e., disabled). this causes the outputs of logic circuits 121 to be delivered to encoder 111.

During the rescanning period resulting from a rejected character, selected output lines of source 110 are caused to develop a binary ONE level causing the associated AND-gates 124 corresponding to the most probable choices of the degraded character to be turned ON coupling their threshold logic circuits to encoder 111.

The threshold logic circuits 122 whose function is to determine whether or not a rejected character possesses most of the features for each of the probably characters, need only be capable of deciding whether the most likely character estimated by the computer was an improper selection and/or selecting a single most likely character from among a plurality of probable characters. The logic circuitry for rescanning can be realized with a smaller number of features and a simpler circuit structure than would be required for character recognition during an initial scanning operation fort the following reason:

During initial scanning, a single character should be selected from among all characters comprising the group for which the system is capable of recognizing by means of the recognition logic circuitry employed during initial scanning. However, during rescanning one character need be decided only by the recognition logic employed during the rescanning operation from among only one, or at most a few, of the most probable characters and in any case substantially less characters than the total number in which the system is capable of recognizing.

As one example, in the recognition of Chinese characters, the recognition logic employed during rescanning may be logic circuits capable of recognizing merely a part of the constituent strokes of a character such as the signific or the phonetic.

Whereas the foregoing description sets forth two preferred embodiments, each of which has been described as incorporating a general purpose electronic computer, it should be understood that such selection has been merely for purposes of facilitating an understanding of the invention and further for the reasons that such character recognition systems have been operated conventionally as an input device connected ONLINE to electronic computers and that the utilization of idle periods of computers for estimation of rejected characters was one of great convenience. There is no objection, however for OFF-LINE operation to associate the character recognition system with a special purpose digital device or circuit which would perform equivalent operations attributed to a general purpose computer. Obviously, such a digital circuit can be readily designed based on the procedure of the above description.

Although the instant invention has been described above in connection with the two embodiments thereof, it will be seen that both embodiments are substantially the same insofar as the following inventive concepts are concerned, to wit:

a. Provision of coarse-match character recognition circuitry (which is comprised of a combination of correlation networks 104 and threshold level-decreasable threshold level circuitry 106 as shown in FIG. 2; or the threshold logic 122 of FIG. 3) which is capable of estimating whether or not most of the features of a most logical character are present in the rescan character, in addition to the normal fine-match character recognition circuitry (which is the combination of correlation networks 104 and normal-threshold-level threshold circuitry 106 shown in FIG. 2; or the character recognition logic 121 of FIG. 3).

b. In those cases where a reject situation occurs, the rejected character is estimated as being one most logical choice or as being one of a group of most logical choices by means of an electronic computer or the like and rescanning is performed on at least the rejected character.

c. As a result of the rescanning operation, a decision is made as to whether or not the estimation was correct by a coarse-match character recognition circuit and/or selection is made of the most likely character from among a small group of characters representing the most likely choices of the degraded character which has been scanned.

While the principles of the instant invention have been particularly illustrated and described with reference to two preferred embodiments, it should be readily understood by those skilled in the art that character recognition systems incorporating other than the above-mentioned means, for example, other optical character recognition means, or magnetic ink character recognition means may be employed as the scanning means and all such techniques fall within the scope of the instant invention without departing from the spirit of the invention.

The embodiments of the invention in which an exclusive privilege or property is claimed are defined as follows:

1. A character recognition system for automatically identifying characters and/or other symbols printed or otherwise formed upon the surface of a document comprising:

first means for initially scanning each of the characters of said document for generating an electrical signal pattern corresponding to the pattern of the region occupied by each character on the document;

first recognition means imposing strict recognition criteria upon said electrical pattern for recognizing a scanned character provided that the quality of the scanned character is relatively good;

means coupled to said first recognition means for generating a reject signal due to a failure of recognition of a character as a result of its poor quality;

means coupled to said first recognition means and said reject signal generating means for estimating the most logical choices of the rejected character as a result of an evaluation of the successfully recognized characters of said group, said estimation operation being performed only upon receipt of a reject signal;

said estimating means further including means for generating a signal to cause said first means to rescan at least said rejected character;

second recognition means for determining the identity of the rescanned character imposing less stringent recognition criteria upon said electrical pattern;

means coupled between said estimating means and said second recognition means for coupling only those output signals developed by said second recognition means which correspond to the most likely choices of the rejected character and for disabling all other possible output signals of said second recognition means.

2. Means for recognizing characters and/or other symbols arranged on the surface of a document to be scanned comprising first scanning means for initially scanning each character in sequential fashion;

second means for converting light reflected from elemental areas of a character into an electrical signal pattern representative of the illuminated character;

third means coupled to said second means for correlating the received electrical signal pattern with preset thresholds for generating a signal representative of the scanned character and/or symbol;

said third means including correlation circuits for each character and/or symbol capable of being identified for each circuit having an output terminal, at least one of said circuits generating an output signal to identify the illuminated character;

fourth means for encoding the output of each circuit into a binary code representative of the illuminated character; said fourth means including fifth means for generating a reject indication for any character or symbol failing identification;

gating means for selectively coupling the outputs of said circuits to said fourth means;

sixth means for receiving said codes from said fourth means;

said sixth means including means for evaluating the successfully recognized characters to generate a first output signal representing the most logical choices of the character failing recognition and generating a second output signal requesting a rescanning operation;

said first scanning means receiving said second output signal for rescanning at least that character or symbol failing recognition;

control means coupled to said gating means receiving said first output signal for enabling only the circuits corresponding to the most probable choices of the deficient character or symbol to be connected to said fourth means.

3. The means of claim 2 wherein said circuits each have selectable first and second threshold levels;

said sixth means further comprising means for generating a third output signal;

second control means coupled to said circuits for normally controlling said circuits to operate at their first threshold levels and for shifting said circuits to operate at their second threshold levels upon receipt of said third output signal.

4. The means of claim 2 wherein said first means is a flying spot scanning means.

5. The means of claim 2 wherein said sixth means is comprised of computer means for evaluating successfully recognized characters to determine the most probable choices for a character failing recognition.

6. Means for recognizing characters and/or other symbols arranged on the surface of a document to be scanned comprising first scanning means for initially scanning each of said characters in sequential fashion;

second means for converting light reflected from elemental areas of a character into an electrical signal pattern representative of the illuminated character;

third means coupled to said second means for correlating the received electrical signal pattern with preset thresholds for generating a signal representative of the illuminated character;

said third means including a pair of correlation circuits for each character and/or symbol capable of being identified for each circuit having an output terminal, at least one of said circuits generating an output signal to identify the illuminated character, one circuit of each pair of circuits imposing strict identification criteria and the remaining circuit of each pair of circuits imposing less strict identification criteria;

fourth means for encoding the output of each circuit into a binary code representative of the illuminated character, said fourth means including fifth means for generating a reject indication for any character or symbol failing identification;

gating means for selectively coupling the outputs of said circuits to said fourth means;

sixth means for receiving said codes from said fourth means;

said sixth means including means for evaluating the successfully recognized characters to generate a first output signal representing the most logical choices of the character failing recognition and generating a second output signal requesting a rescanning operation;

said first scanning means receiving said second output signal for rescanning at least that character or symbol failing recognition;

control means coupled to said gating means receiving said first output signal for normally enabling all of said one circuits of each pair and for disabling the remaining circuits of said pair in the absence of said first output signal and for enabling the remaining circuits of only those circuits corresponding to the most probable choices of the deficient character or symbol to be connected to said fourth means.